United States Patent [19]
Godwin

[11] Patent Number: 5,415,421
[45] Date of Patent: May 16, 1995

[54] TRAY DEVICE FOR WHEELBARROWS

[76] Inventor: Marvin C. Godwin, 965 C.C. Howard St., Niceville, Fla. 32578

[21] Appl. No.: 112,152

[22] Filed: Aug. 26, 1993

[51] Int. Cl.⁶ ............................................. B62B 1/04
[52] U.S. Cl. .......................... 280/47.31; 280/47.18; 224/42.43
[58] Field of Search ............... 280/47.31, 47.3, 659, 280/47.19, 47.18; 206/335; 220/480, 476; 224/274, 42.43, 42.46, 42.11; 298/3

[56] References Cited

U.S. PATENT DOCUMENTS

| | | | |
|---|---|---|---|
| 1,687,327 | 10/1928 | De Boer | 220/476 X |
| 1,769,271 | 7/1930 | Parsons | 280/47.31 |
| 2,131,673 | 9/1938 | Robinson . | |
| 2,384,235 | 9/1945 | Burnett | 280/47.3 X |
| 2,389,294 | 11/1945 | Burke | 280/659 |
| 2,597,544 | 5/1952 | Swain . | |
| 2,636,747 | 4/1953 | Blackmond | 280/47.31 |
| 2,673,671 | 3/1954 | Williams | 224/42.46 |
| 2,764,845 | 10/1956 | Colombini | 280/47.31 |
| 3,987,947 | 10/1976 | Della Pella | 224/42.43 X |
| 4,341,393 | 7/1982 | Gordon et al. | 280/47.26 |
| 4,521,030 | 6/1985 | Vance | 280/47.26 |
| 4,708,274 | 11/1987 | Roche | 224/42.43 X |

FOREIGN PATENT DOCUMENTS

| | | | |
|---|---|---|---|
| 2292617 | 6/1976 | France | 280/659 |
| 713568 | 8/1954 | United Kingdom | 280/47.31 |
| 2073677 | 10/1981 | United Kingdom | 280/47.31 |

*Primary Examiner*—Margaret A. Focarino
*Assistant Examiner*—Carla Mattix
*Attorney, Agent, or Firm*—Shlesinger, Arkwright & Garvey

[57] ABSTRACT

The present invention is directed to a tray device for a wheelbarrow comprising a bottom surface, a front wall, rear wall and side walls forming an open top. The open top forming a trapezoid having an area greater than the area of the bottom surface, the side walls each forming a trapezium having all sides of unequal length and mounting supports for securing the device to a wheelbarrow when positioned between a pair of wheelbarrow shafts.

13 Claims, 2 Drawing Sheets

TRAY DEVICE FOR WHEELBARROWS

FIELD OF THE INVENTION

The present invention relates to a tray for carrying various items and more particularly to a tray adapted for use in conjunction with a wheelbarrow to increase the carrying capacity of the wheelbarrow.

BACKGROUND OF THE INVENTION

Conventional wheelbarrows include a large trough or hopper supported by a pair of parallel handle shafts. The shafts extend rearwardly of a front wheel thereby permitting a user to stand between the shafts, grasp the ends of the shafts and lift, move and maneuver the wheelbarrow.

From commercial construction to backyard gardening, the wheelbarrow provides an efficient and economical means for conveying various materials. Because of its widespread use and the different types of work in which it is used, numerous items such as hand tools, gloves, bottled fluids, or other equipment are required when using the wheelbarrow.

In the past, transporting these accessories with the wheelbarrow has meant either placing them in the trough along with the bulk material being transported or hanging the tools on the wheelbarrow shaft. As is readily apparent, such methods are unsatisfactory since the tools are prone to damage due to jostling in the trough or falling off.

A need has therefore existed within the art to provide a means for carrying various tools and accessories needed by a wheelbarrow operator. In addition, it is desirable that any such carrying device be designed so that liquids or fluids within the carrying device are kept level while the wheelbarrow is being moved. Further, it is desirable to have a carrying device which will not interfere with the normal use of the wheelbarrow.

OBJECTS AND SUMMARY OF THE INVENTION

It is therefore an object of the present invention to provide a tray device for a conventional wheelbarrow which is readily attachable to the wheelbarrow with a minimum of effort and which provides supplemental carrying space for various tools or other articles during use.

An additional object of the present invention is to provide a tray device for wheelbarrows which is designed to keep liquids carried within the tray level and therefore less likely to spill when the wheelbarrow is moved.

A still further object of the present invention is to provide a tray for wheelbarrows which may be easily secured to the wheelbarrow, is readily removed from the wheelbarrow and will not interfere with the use of the wheelbarrow.

Yet another of the present invention is to provide a tray device for wheelbarrows having a unique, unitary construction.

A further object of the present invention is to provide a tray device for wheelbarrows which can be easily manufactured and is readily stackable and storable for display purposes in a retail store.

Yet another object of the present invention is to provide a tray device for wheelbarrows which promotes operator comfort and safety during lifting and maneuvering the wheelbarrow.

Still a further object of the present invention is to provide a tray device for a wheelbarrow which readily attaches to standard wheelbarrow handle shafts.

A still further object of the present invention is to provide a tray device for wheelbarrows which allows the user to move the wheelbarrow forward without spilling the contents within the tray.

These and other objects of the present invention are accomplished by providing a tray device for wheelbarrows comprising a bottom surface, a front wall, rear wall and side walls forming an open top, the open top forming a trapezoid having an area greater than the area of the bottom surface, the sidewalls each forming a trapezium having all sides of unequal length and mounting supports for securing the tray device to a wheelbarrow when positioned between a pair wheelbarrow shafts.

DETAILED DESCRIPTION OF THE INVENTION

Figure 1:
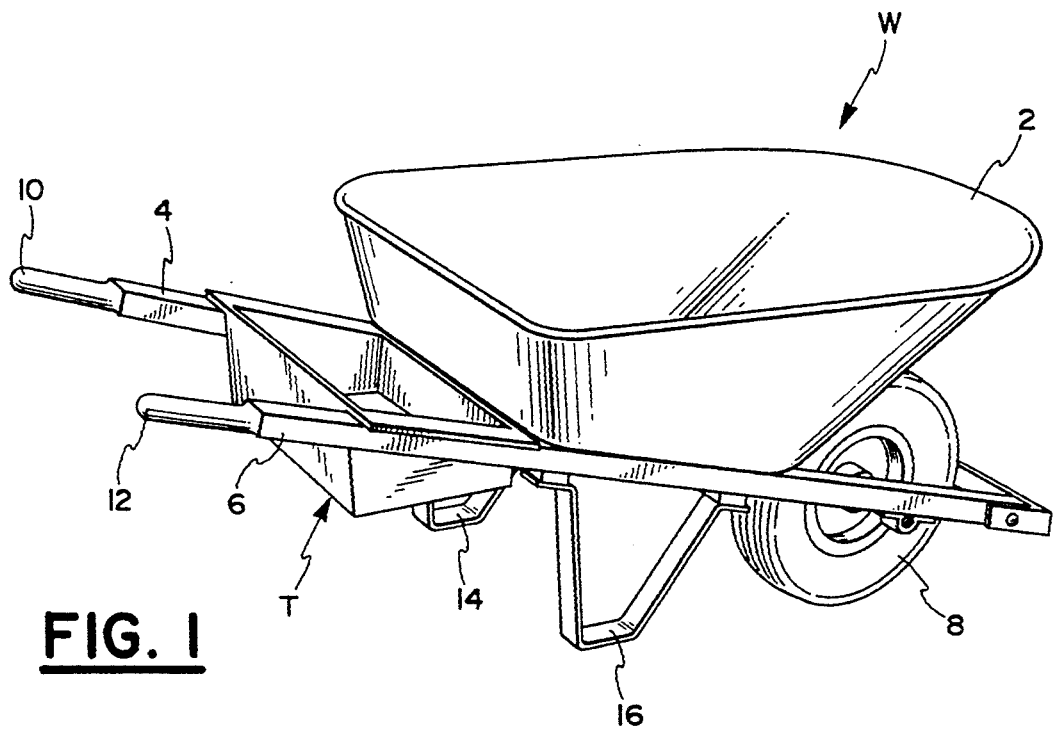
FIG. 1 is a perspective view illustrating the tray device according to the present invention when attached to a conventional wheelbarrow.

FIG. 1 illustrates a wheelbarrow W incorporating the tray device T of the present invention. The wheelbarrow W includes a hopper 2 supported by a pair of parallel handle shafts 4 and 6 extending rearwardly of a front wheel 8. The ends of the parallel handle shafts 4 and 6 are provided with handle grips 10 and 12 for lifting and moving of the wheelbarrow W by an operator (not shown). The wheelbarrow W is also provided with parallel supports 14 and 16 positioned beneath the hopper 2 for supporting the wheelbarrow W when in the resting position.

Figure 2:
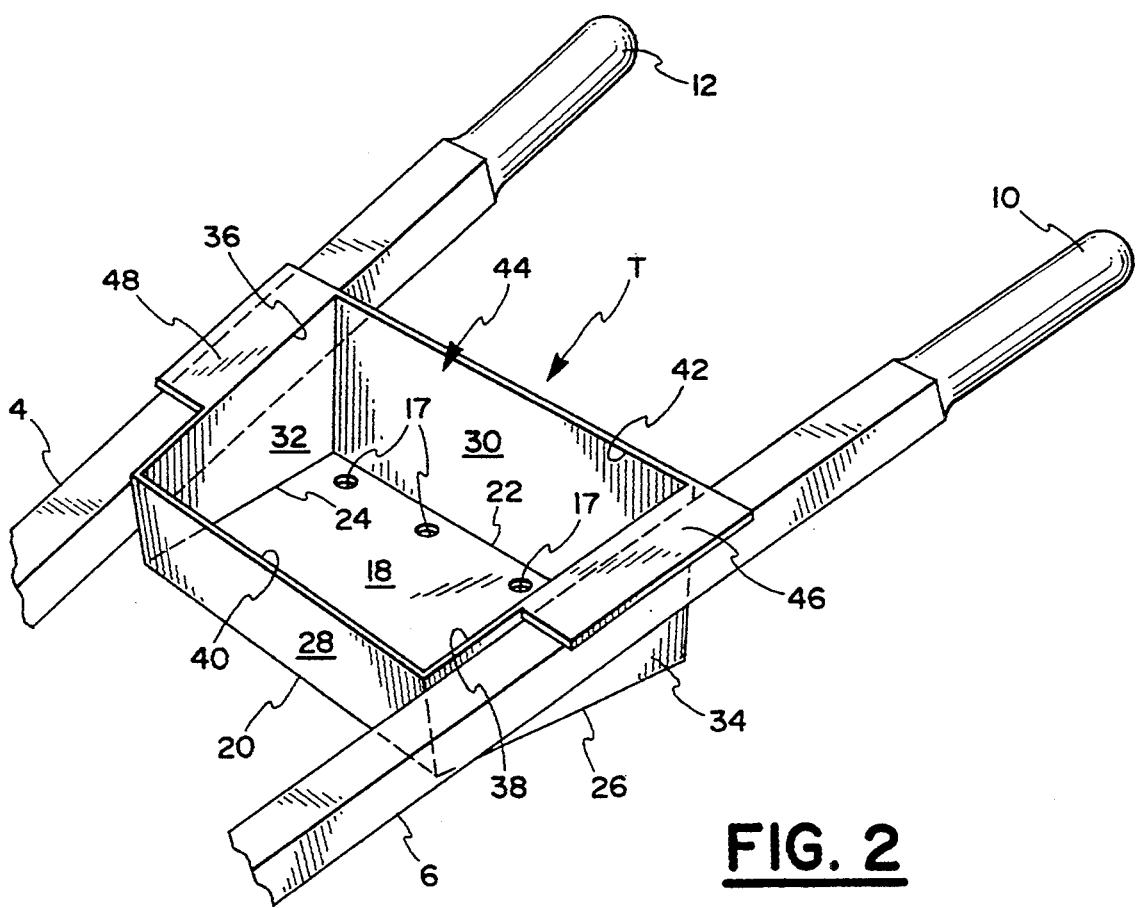
FIG. 2 is a enlarged perspective view of the tray device shown in FIG. 1 with portions of the wheelbarrow broken away and portions of the tray in hidden lines.

Turning now to FIG. 2, the tray device according to the present invention is shown in greater detail. The tray T is shown positioned between the handle shafts 4 and 6 and forward of the handle grips 10 and 12. The tray device T includes a bottom surface 18 having a trapezoidal shape, i.e. the front bottom edge 20 and the rear bottom edge 22 are parallel while side bottom edge 24 and side bottom edge 26 are nonparallel. Bottom surface 18 includes drain holes 17.

A generally rectangular front wall 28 is positioned forward of a generally rectangular rear wall 30. The front wall 28 has a smaller surface area than rear wall 30. Side walls 32 and 34 are also provided. Each of the side walls form a trapezium, i.e. a quadrilateral plane figure of which no two sides are parallel. Each of the sidewalls 32 and 34 are provided with top edges 36 and 38 and in a similar manner the front wall 28 and rear wall 30 are provided with a top front wall edge surface 40 and top rear wall edge surface 42.

The upper side wall edge surfaces 36 and 38, the front wall edge surface 40 and the rear wall edge surface 42 intersect to form an open top 44 having a trapezoidal shape, the surface area of which is greater than that of bottom surface 18. It can therefore be seen that the front wall 28 and rear wall 30 generally form rectangles, the bottom surface 18 and the open top 44 form trapezoids while the side walls 32 and 34 each form trapeziums. This geometric design allows the device to be snugly positioned between the shafts in a flush and nonobtrusive manner and also assists in keeping fluids in the tray from spilling while the wheelbarrow is moved.

Mounting supports comprising a pair of flanges 46 and 48 are also provided. Flange 46 comprises a planar, flat surface extending outwardly from the upper side wall edge surface 38 and laterally from the open top 44 so that the open top 44 is coplanar with wheelbarrow handle shaft 6 once the tray device T is positioned between the handle shafts 4 and 6. In a similar manner, the flange 48 also extends laterally of open top 44 and along upper side wall edge 36. Each of the flanges 46 and 48 engage the top surface of shafts 4 and 6 to provide support for tray T. As best shown in FIG. 1, tray T may be simply placed between the handle shafts 4 and 6 and slid florward toward the trough 2 until the tray wedges into a secure position. However, if desired the tray may be permanently affixed to the handle shafts 4 and 6 through the use of fasteners, bolts or other securing means.

Figure 3:
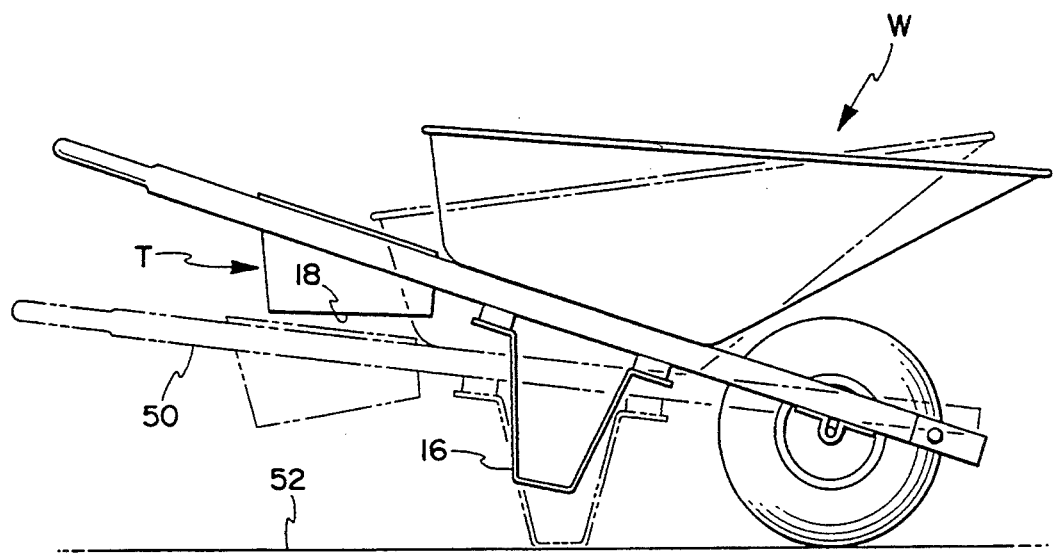
FIG. 3 is a side elevational view illustrating the position of the tray once the wheelbarrow is lifted from a resting position shown in phantom lines to an upright position prior to being moved.

Turning now to FIG. 3, a wheelbarrow 50 is shown in a resting position on the ground and in a raised position (phantom lines) when lifted by an operator (not shown). As can be appreciated, the tray device T is configured so that when in the raised position, the bottom surface 18 is substantially parallel to the ground 52 and contents in the tray which are otherwise subject to spilling are maintained in a relatively level position as the operator moves the wheelbarrow.

A variety of available materials are contemplated within the scope of the present invention for constructing the tray device T. These materials include but are in no way limited to wood, plastics including high density resins as well as fiberglass type resins. The main quality of the chosen material is that it is rigid enough to readily support articles placed within the tray yet light enough to not excessively contribute to the weight of the wheelbarrow. It is further within the scope of the present invention to provide drain holes extending through the bottom surface 18. In an alternative embodiment, the bottom surface may be constructed in an open lattice design rather than planar sheet. In addition, beverage holders or clips to secure various tools may be provided to the interior or exterior of the tray if desired.

Figure 4:
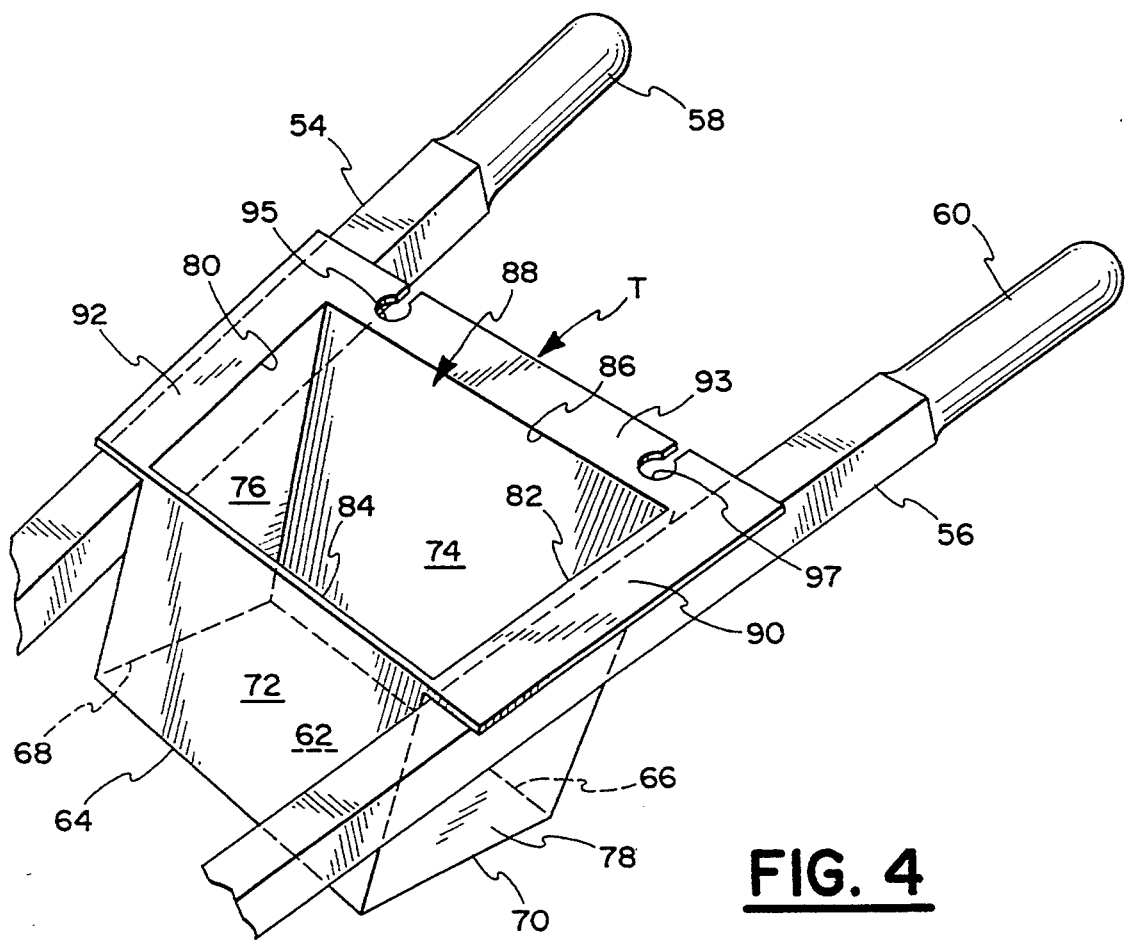
FIG. 4 illustrates another tray device according to the present invention with portions of the wheelbarrow broken away and portions of the tray shown in hidden lines.

Turning now to FIG. 4, an alternative embodiment of the present invention is shown positioned between a pair of handle shafts 54 and 56 of a wheelbarrow (not shown). A bottom surface 62 having a generally trapezoidal configuration is shown having a front bottom edge 64, rear bottom edge 66, side bottom edge 68 and side bottom edge 70. A front wall 72 and rear wall 74 are also provided with the front wall 72 occupying a smaller surface area than rear wall 74. Side walls 76 and 78 are shown, the side walls each forming a trapezium wherein no two sides are parallel.

Upper side wall edge surface 80, upper side wall edge surface 82, a front wall edge surface 84 and rear wall edge surface 86 intersect to form an open top 88 having a trapezoidal configuration wherein the front wall edge surface 84 and rear wall edge surface 86 are parallel and the upper side wall edge surface 80 and upper side wall edge surface 82 are nonparallel. The surface area occupied by open top 80 is greater than that occupied by bottom surface 62.

Mounting supports or flange portions 90 and 92 are provided, each of which extends laterally of upper side wall edge surface 82 and upper side wall edge surface 80 respectively. The flange portions 90 and 92 are shown extending along the entire length of upper side wall edge surface 82 and upper side wall edge surface 80. If desired, the flange portions 90 and 92 may be designed to extend only a portion along the length of upper side wall edge surfaces 80 and 82. A rear Flange 93 is also shown extending from rear wall 74 and includes tool support holes 95 and 97.

The tray T is disposed between the handle shafts 54 and 56 so that the flange portions 90 and 92 support the tray T. The tray is placed between the handle shafts 54 and 56 and slid forward towards the trough (not shown) until the tray wedges between shafts 54 and 56 into a secure position. As noted earlier, the flange portions 90 and 92 may be permanently secured to the handle shafts 54 and 56 by the provision of attachment means such as bolts, screws or the like.

While this invention has been disclosed as having a preferred design, it is understood that it is capable of further modifications, and uses and/or adaptations of the invention and following in general the principle of the invention and including such departures from the present disclosure as come within the known or customary practice in the art of which the invention pertains, and as may be applied to the central features hereinbefore set forth, and fall within the scope of the invention or limits of the claims appended thereto.

I claim:

1. A tray device for a wheelbarrow comprising:
   a) a bottom surface;
   b) front wall, rear wall and side walls extending upwardly from said bottom surface and forming an open top;
   c) said open top forming an isosceles trapezoid to enable said front, rear and side walls to interfit between a pair of wheelbarrow shafts, said open top having an area greater than the area of said bottom surface;
   d) said side walls each forming a trapezium having all sides of unequal length whereby said bottom surface and said open top form an acute angle with respect to each other; and
   e) mounting supports for securing said device to a wheelbarrow, said mounting supports extend laterally of said side wall portions and parallel to said open top and are configured for engagement with a pair of wheelbarrow shafts so that when said tray is engaged with the shafts of a wheelbarrow and said wheelbarrow is lifted, said bottom surface will be maintained substantially level and fluid or other material within said tray device is contained without spillage.

2. A tray device as set forth in claim 1 and wherein:
   a) said mounting supports comprising flange portions.

3. A tray device as set forth in claim 1 and wherein:
   a) said bottom surface forming a trapezoid.

4. A tray device as set forth in claim 1 and further including:

a) drain holes in said bottom surface.

5. A tray device as set forth in claim 1 and wherein:
a) said side walls taper inwardly from said rear wall toward said front wall.

6. A tray device as set forth in claim 1 and wherein:
a) said front wall having an area less than said rear wall.

7. A tray device as set forth in claim 1 and wherein:
a) said rear wall forming a 90° right angle to said bottom surface.

8. A tray device as set forth in claim 1 and wherein:
a) said mounting supports comprising hanger portions.

9. A tray device as set forth in claim 1 and wherein:
a) said front wall and said rear wall forming rectangles of unequal area.

10. A tray device as set forth in claim 1 and wherein:
a) said tray is constructed from high density plastic.

11. A tray device as set forth in claim 2 and wherein:
a) said flange portions extend along the length of said side wall portions.

12. A tray device as set forth in claim 1 and wherein:
a) said rear wall forming an obtuse angle to said bottom surface.

13. A tray device as set forth in claim 12 and wherein:
a) said front wall is parallel to said rear wall.

* * * * *